United States Patent [19]

Cheng

[11] 4,039,918
[45] Aug. 2, 1977

[54] CONTROL FOR ROTATABLE STORAGE UNIT

[75] Inventor: Karl C. H. Cheng, Albert Lea, Minn.

[73] Assignee: Litton Business Systems, Inc., Beverly Hills, Calif.

[21] Appl. No.: 601,353

[22] Filed: Aug. 4, 1975

[51] Int. Cl.² ............................................ G05B 19/28
[52] U.S. Cl. .................................. 318/602; 318/673; 318/468
[58] Field of Search ............... 318/601, 602, 673, 664, 318/467, 468, 484–487, 365; 312/198–202; 214/16.4 A, 16.1 A; 307/141.4, 141.1

[56] References Cited

U.S. PATENT DOCUMENTS

| | | | |
|---|---|---|---|
| 3,118,096 | 1/1964 | Gavreau et al. | 318/602 |
| 3,399,753 | 9/1968 | Revelle | 318/602 |
| 3,573,589 | 4/1971 | Berry | 318/601 |
| 3,808,484 | 4/1974 | Trotta | 318/467 |

Primary Examiner—Robert K. Schaefer
Assistant Examiner—John J. Feldhaus
Attorney, Agent, or Firm—Robert E. Lowe

[57] ABSTRACT

A storage unit divided into a plurality of stations, is rotatable about a vertical axis to allow any given station to be turned to a position where the articles at that station can be retrieved. A control circuit is provided to allow an operator to select a station, provide an input indicative of that selection, and have the unit rotate through the shortest distance to provide access to the selected station.

10 Claims, 6 Drawing Figures

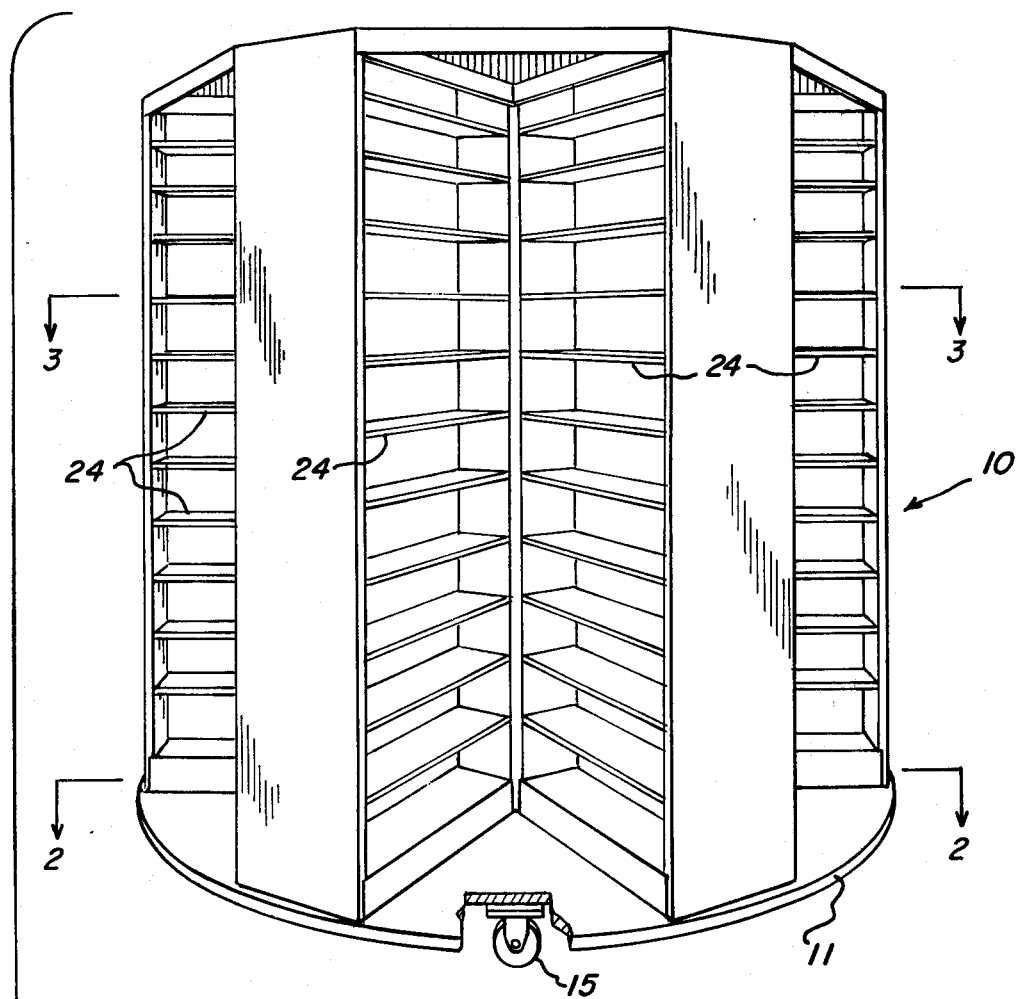
FIG. 1
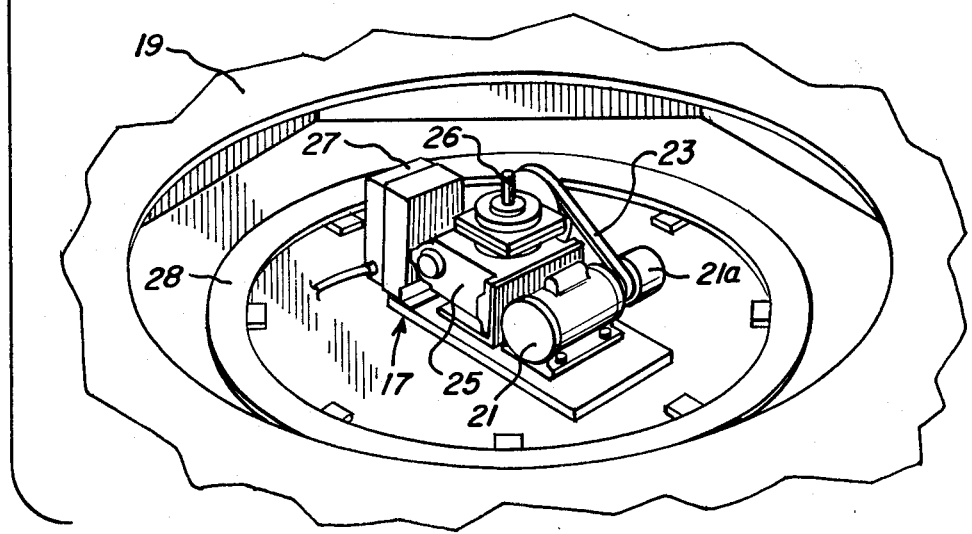

CONTROL FOR ROTATABLE STORAGE UNIT

BACKGROUND OF THE INVENTION

This invention relates to the field of article storage and retrieval, and more specifically to apparatus adapted for the storage of a variety of descreet articles in a relatively compact space, the apparatus having provisions to allow the rapid and systematic retrieval of a selected group of such articles. More specifically, the invention provides a control system for an article storage and retrieval unit whereby the unit can be moved in response to operator commands to provide access to a selected group of articles.

In many types of retail sales activity there is a requirement for the seller to have on hand a large variety of related but nonidentical goods. For example, a paint seller must have available a variety of different colored paints; a hardware seller a variety of nails, screws and other fasteners of different types and sizes; and a pharmacist a variety of drugs used in filling prescriptions. These items may require a large amount of storage space, and are frequently stored on long rows of shelves arranged horizontally and vertically in a particular area of the seller's place of business. Storage of this type has inherent inefficiencies both in terms of space requirements and in terms of ease of retrieval of any selected article within the group.

The problem is exemplified in the operation of a modern pharmacy. In such an installation, the pharmacist must have a vast quantity of different prescription drugs available to him. The drugs and other pharmaceuticals must be stored in a manner that will allow the pharmacist to easily retrieve any particular item, and in a manner occupying a minimum of space.

A retrieval unit designed to fulfill the foregoing requirements is shown in the U.S. Patent Application, Ser. No. 423,556, filed Dec. 11, 1973, and assigned to the present assignee. Such a unit has the general configuration of a cylinder having its axis of rotation vertically oriented. The cylinder may be divided into a plurality of segments or stations, each station having a suitable arrangement of shelves on which articles may be stored. It is desirable to have such a unit move in rotary motion to provide ready access to any selected segment, without the necessity for the operator to walk around the unit.

When a storage unit of the type described is used in a pharmaceutical application, many of the articles stored therein will be bottles and jars which are small and lightweight. It is therefore important that the unit be capable of starting and stopping its rotation in a smooth manner so that the articles are not tipped and spilled as a result of the rotational acceleration and deceleration of the unit.

It is an object of the present invention to provide a control system for a rotatable storage unit that allows the unit to be rotated through a selected number of degrees of rotation on command of an operator.

Another object of the invention is to provide a control system for a rotatable storage unit having a plurality of stations whereby the control system assures rotation of the unit from one station to another via the shortest available path.

A still further object of the invention is to provide a control system for a rotatable storage unit whereby the unit can be quickly and rapidly rotated from one position to another without abrupt starting and stopping.

Yet another object of the invention is to provide a control system for a rotatable storage unit wherein the control system is relatively small and compact.

These and other objects of the invention will be discussed in further detail and will in part become apparent as the specification proceeds.

DESCRIPTION OF THE DRAWINGS

The present invention will be described in detail by reference to the accompanying drawings in which:

FIG. 1 is a perspective view of a rotatable storage unit for which the control circuit of the present invention is particularly suited, the figure being partially broken away and exploded to show the drive mechanism located at the base of the unit;

DESCRIPTION OF PREFERRED EMBODIMENTS

Figure 3:
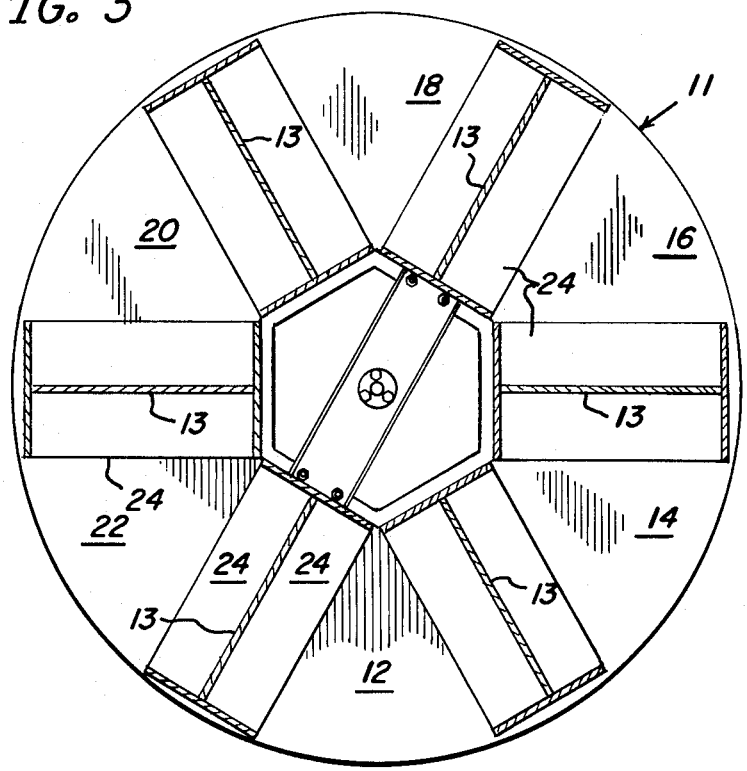
FIG. 3 is a horizontal cross-sectional view taken along line 3—3 in FIG. 1.

The storage unit 10 shown in the drawings is particularly well suited to operation by the control system of the present invention. The unit 10 is divided into six equal sections or stations 12, 14, 16, 18, 20 and 22. Each station is configured to provide a plurality of shelves 24 for the storage of articles thereon. While the v-shaped arrangement of the shelves offers an efficient use of space, other arrangements within each station could also be utilized.

The unit 10 includes a circular base 11 and a plurality of vertical panels 13 dividing the unit into the selected number of stations. While the unit shown has been divided into six sections, similar units can be divided into any reasonable number of sections as a matter of choice, with corresponding changes in the selection of station dependent components in the control circuit to be described in more detail hereinafter.

A plurality of casters 15 are fixed to base 11 to support the unit and allow it to be rotated around a circular track 28 provided on the floor. In a typical installation, the drive unit 17 is securely mounted on the floor and a raised superstructure or platform 19 is provided such that when the installation is complete, base 11 is flush with platform 19, the drive unit 17 and casters 15 being hidden below the unit itself and platform 19.

Drive unit 17 includes an electric motor 21 and hydraulic clutch 21a, drive belt 23, gear box 25, drive shaft 26 and electrical control box 27. Drive shaft 26 is coupled to the base 11 to provide the rotational force to rotate the unit 10 about the track on casters 15.

Figure 2:
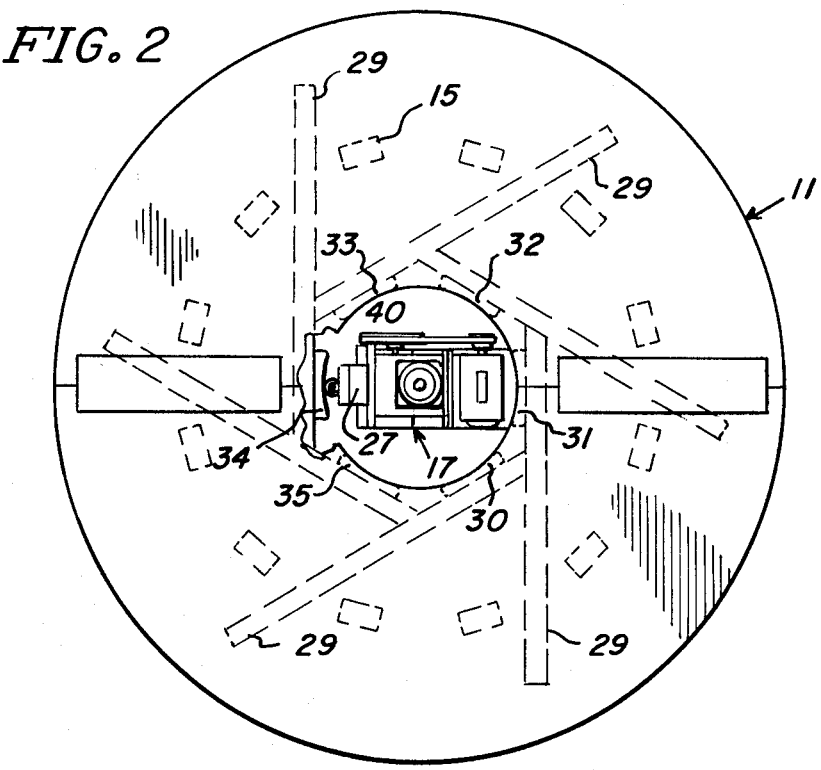
FIG. 2 is a horizontal cross-sectional view taken along line 2—2 in FIG. 1.
Figures 5, 6:
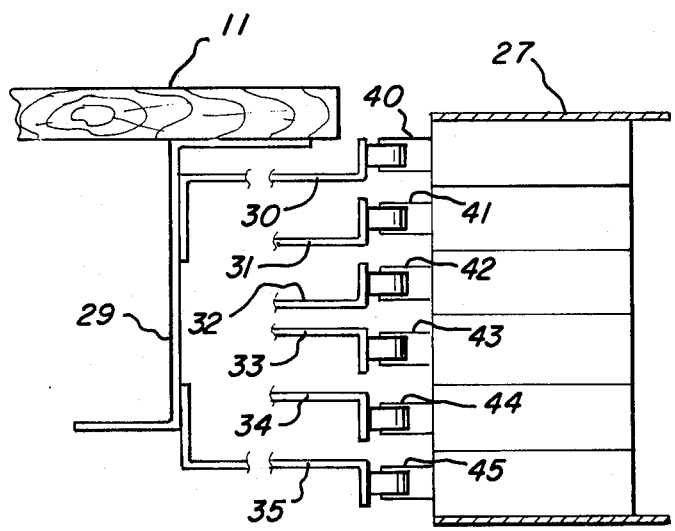
FIG. 5 is a diagrammatic view showing the alignment of cam surfaces and cam followers.
FIG. 6 is a logic truth table for the circuit of FIG. 4.

Base 11 is supported by a plurality of braces 29, shown in FIG. 2, which are arranged across various segments of the circular base 11. The interior end of each brace intersects an adjacent brace to form a polygonal shape taking the form of a regular hexagon as shown in the drawings. Mounted on the interior side of the polygon are a plurality of cam surfaces 30, 31, 32, 33, 34 and 35. Each of the cam surfaces is located below the center of one of the sections of unit 10, so that cam surface 30 corresponds to section 12, surface 31 to section 14, surface 32 to section 16, surface 33 to section 18, surface 34 to section 20, and surface 35 to section 22. Each of the cam surfaces 30 through 35 are located at different vertical heights relative to one another as indicated in FIG. 5.

Electrical control box 27 includes a plurality of spring biased cam followers 40, 41, 42, 43, 44 and 45 arranged vertically to engage cam surfaces 30 through 35 respectively. The engagement of each cam follower with its respective cam surface provides an input to the logic circuit shown in FIG. 4 to detect and control the rotational position of the unit 10, in a manner to be described more fully hereinafter.

When a retrieval unit of the type described herein is used for the storage of small articles, such as pharmaceuticals, the overall size and weight of the unit is very large relative to an individual article placed on one of the shelves, which is typically a small bottle of tablets or like. It is therefore necessary to rotate the unit in a very smooth operation so that the contents of the shelves are not spilled and tipped by the acceleration and deceleration of the unit. Such operation is achieved through the use of hydraulic clutch 21a in cooperation with the cam surfaces 30 through 35. Through the use of appropriate timing circuits, the unit can be made to stop rotation at any point along a particular cam surface. Initial engagement of a cam follower with the leading edge of a cam surface initiates the timing circuit, and the timing circuit then determines the precise stopping point on the cam surface. In this manner, abrupt stops and starts are avoided.

In operation, it is desirable to provide for the rotation of the unit from one station to another in response to a command, such as by pushing a button. It is further desired that the unit rotate in either direction, clockwise or anticlockwise, and to always rotate through the shortest distance in order to go from a first station to a second selected station. Using a binary logic system, a truth table can be constructed to illustrate the necessary circuit logic. The table for the circuit of the present invention is set out in FIG. 6 wherein $L_1$ through $L_6$ are limit switches operable by cam followers 40 through 45 respectively; $P_1$ through $P_6$ represent the signals from pushbuttons 1 through 6, each button number corresponding to a unit station 12, 14, 16, 18, 20 and 22 respectively. The letter F indicates forward or clockwise rotation the letter R reverse or anticlockwise rotation. The numbers 0 and 1 indicate relative low and relative high voltage respectively.

From the table shown in FIG. 6, the following equations defining the forward and reverse rotation of the unit through the shortest distance can be derived:

$$F = L_1(P_2+P_3) + L_2(P_3+P_4) + L_3(P_4+P_5) + L_4(P_5+P_6) + L_5(P_6+P_1) + L_6(P_1+P_2)$$

or $$F = P_1(L_5+L_6) + P_2(L_1+L_6) + P_3(L_2+L_1) + P_4(L_3+L_2) + P_5(L_4+L_3) + P_6(L_5+L_4)$$

$$R = L_1(P_4+P_5+P_6) + L_2(P_5+P_6+P_1) + L_3(P_6+P_1+P_2) + L_4(P_1+P_2+P_3) + L_5(P_2+P_3+P_4) + L_6(P_3+P_4+P_5)$$

or $$R = P_1(L_2+L_3+L_4) + P_2(L_3+L_4+L_5) + P_3(L_4+L_5+L_6) + P_4(L_5+L_6+L_1) + P_5(L_6+L_1+L_2) + P_6(L_1+L_2+L_3)$$

Figure 4:
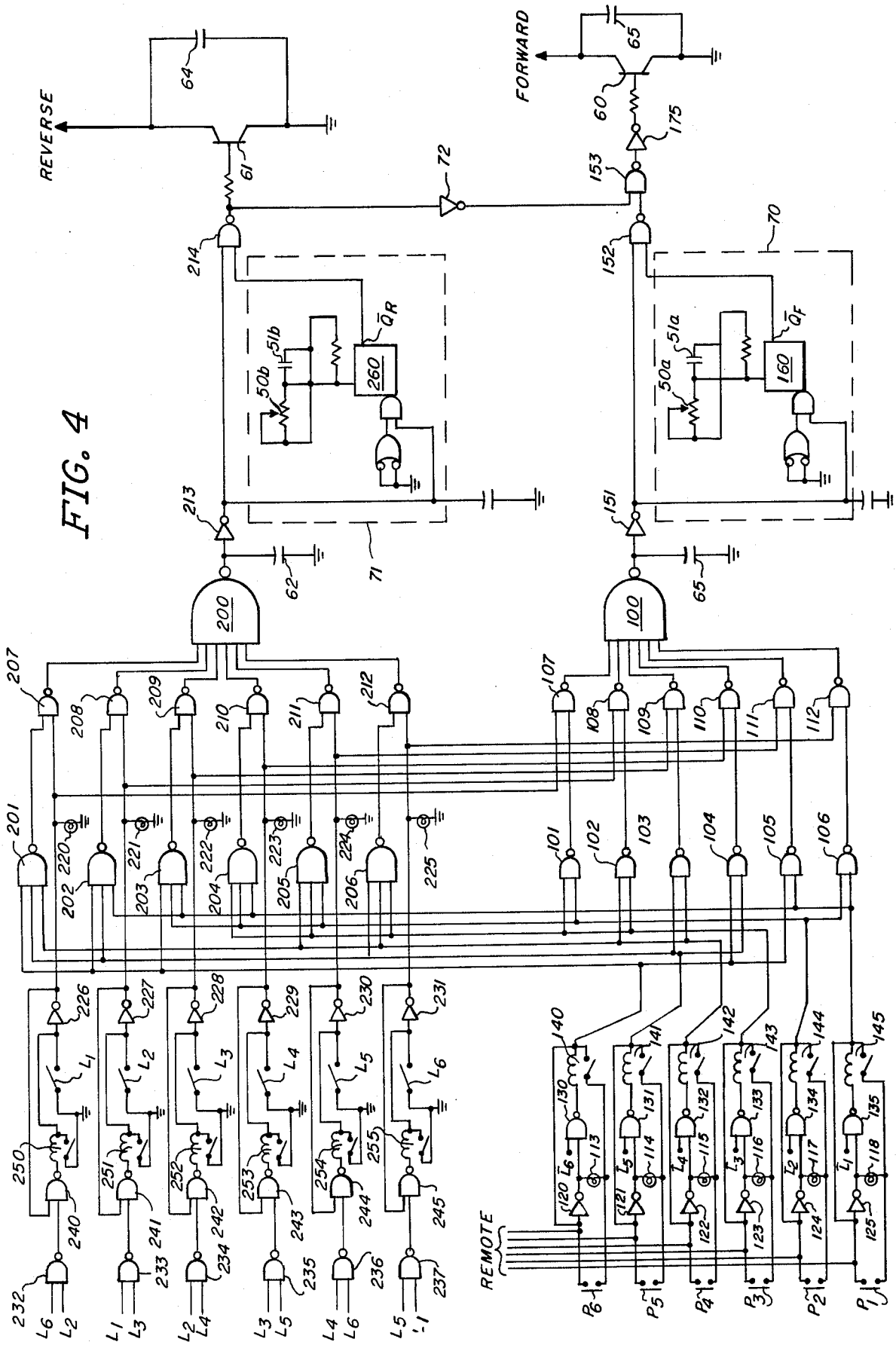
FIG. 4 is a logic circuit diagram of the control circuit of the invention.

Inasmuch as unit 10 has been divided into six stations, a pair of six input positive NAND gates designated 100 and 200 in FIG. 4 provide the basic components for the logic circuit. In conjunction with the NAND gates 100 and 200, a pair of timing circuits 70 and 71 are used to control the time lapse from initial contact of a cam follower with the leading edge of its respective cam surface until the cam follower reaches the preselected stopping point on the cam surface. Timing circuits 70 and 71 each include a monostable multivibrator 160 and 260 each of which incorporate an RC timing circuit consisting of variable resistances 50a and 50b and capacitances 51a and 51b. In addition, the control circuit incorporates a plurality of additional NAND gates, inverters and indicator lights, which components generally occur in multiples of six reflecting the six station unit shown in the drawings. The electronic components are individually commercially available and their basic electronic functions are well known to those skilled in the art.

The operation of the circuit shown in FIG. 4 can best be illustrated by discussion of a typical operation reflecting the incorporation of the logic developed in the table of FIG. 6 into the circuit of FIG. 4. For purposes of illustration, the stations will be numbered 1 through 6 corresponding to sections 12, 14, 16, 18, 20 and 22 of unit 10. It will be understood that any of the sections 12 through 22 could be designated 1, the remaining sections occuring in order around the circle.

Assuming that the unit is stopped at station 1, meaning that that station or section is facing the operator providing access to the shelves in that section. The terms "low" and "high" designate relative voltage levels. The same relative voltages can be represented mathematically by 0 and 1 respectively. Referring to FIG. 4, with the unit stopped at station 1, limit switch $L_1$ is grounded and therefore at 0 or low voltage level. Accordingly, the output of inverter 226, $\overline{L}_1$, is 1 or high. The indicator light for station 1, 220, is on indicating the position of the unit at station 1.

In order to rotate the unit from station 1 to station 3, for example, the operator would depress the pushbutton switch $P_3$. As can be seen from the circuit diagram, the signal at $P_3$ is low. The low signal is applied to the input side of NAND gates 101, 102, 204, 205 and 206. Because of the logic function of a positive NAND gate, the output of 101, 102, 204, 205 and 206 are all high. The high signals thus produced are in turn applied to the input of positive NAND gates 107, 108, 210, 211 and 212. Since limit switch $L_1$ remains closed, $\overline{L}_1$ which is high, provides an input signal to NAND gates 107 and 207. Accordingly, NAND gate 107 is the only gate having high input signals at both terminals. Therefore, the output signal of 107 is 0 or low.

Again, because of the logic function of the positive NAND gate, the output of NAND gate 100 is high, and the output of NAND gate 200 is low. The output of inverter 151 is low which becomes an input to NAND gate 152. Accordingly, the output of NAND gate 152 is high. The output of inverter 151 also inputs to timing circuit 70 which functions only when the input goes from low to high, and the output $\overline{Q}_F$ of timing circuit 70 is high.

Since the output of NAND gate 200 is low, the output of inverter 213 is high and timing circuit 71, which like timing circuit 70 is activated only when its input signal goes from low to high, is not triggered. The output of NAND gate 214 is low, and accordingly the output of inverter 72 is high. Since both inputs to NAND gate 153 are high, its output is low and the output of inverter 175 is high, transistor 60 will conduct, providing the signal to motor 21 to run in the forward direction.

The unit will rotate in the forward direction until the cam surface corresponding to station 2 engages its corresponding cam follower. However, since station 2 is not the selected station, $L_2$ is low, $\bar{L}_2$ is high, which signal is applied to NAND gates 208 and 108. Since only the output of NAND gate 108 is low, the output of gate 100 is still high. The output of inverter 151 is low and the output of NAND gate 152 is also high, hence the output of gate 153 is still low and the output of inverter 175 is still high. Accordingly, the motor will continue running in the forward direction.

As the cam follower corresponding to station 3 hits the leading edge of its respective cam surface, the cam follower activates the limit switch $L_3$. Accordingly, $L_3$ is low, $\bar{L}_3$ is high, and this signal is applied to NAND gates 209 and 109. The output of gates 209 and 109 are high and therefore the output of gate 100 is low and the output of inverter 151 is high. Accordingly, the output of gate 152 is low, gate 153 is high, inverter 175 is low, thereby allowing transistor 60 to go out of conduction.

As has been previously indicated, it is important in a unit of the type described to avoid abrupt stops and starts, and to stop the unit at precisely the selected point each time. To that end, the RC timing circuit included in timing circuits 70 and 71 may be adjusted to allow for a preselected running time after contact by the cam follower with the leading edge of the cam surface, to allow the unit to continue to rotate until the cam follower is centered on its corresponding cam surface. The clutch 21 can absorb the momentum dissipated in deceleration during the small degree of unit rotation between the leading edge of the cam surface and the cam surface center.

With the unit now stopped at station 3, limit switch 3 is connected to ground, hence $L_3$ is low and $\bar{L}_3$ is high. In order to rotate the unit from station 3 to station 6, the operator would depress pushbutton switch $P_6$. The output of $P_6$ is low, which is in turn applied as an input to NAND gates 104, 105, 201, 202 and 203. The outputs of all of the foregoing gates is then high, and they are applied as an input to gates 110, 111, 207, 208 and 209 respectively. NAND gate 209 is the only one of the group receiving two high inputs, and accordingly only its output is low.

With the low input from gate 209, the output of gate 200 is high. Hence the output of inverter 213 is low and the output of NAND gate 214 is high. This signal will cause transistor 61 to conduct, causing motor 21 to run in reverse.

Motor 21 will continue to run in the reverse direction until the cam follower for station 6 engages the leading edge of its respective cam surface. At that moment the output of gate 200 becomes low and the timing circuit 71 receives input information changing from low to high, triggering the circuit. Output $\bar{Q}_R$ becomes low at that instant and remains so for a period selected by adjustment to the RC timing circuit. Since $\bar{Q}_R$ remains low, the output of gate 214 will remain high for a comparable period of time, during which the unit rotates from the leading edge of the cam surface for station 6 to the center of the cam surface, the preselected precise stopping point.

Inverter 72 and NAND gate 153 connecting the forward and reverse sides of the circuit serve an additional circuit safety function. In the event that two pushbuttons are depressed at the same time, inverter 72 will always invert the signal from gate 214 and feed it as an input to gate 153, thereby assuring that the unit will rotate in the reverse direction only as NAND gate 153 will receive a low signal in such circumstances, insuring a low signal to forward running transistor 60.

In addition to the components already described, capacitors 62, 63, 64 and 65 are provided as shown in the circuit. The function of each of these capacitors is to provide a bypass for high frequency noise that might otherwise interfere with the operation of the circuit.

Additionally, each of the limit switches $L_1$ through $L_6$ has associated with it a holding circuit comprised of, for example, NAND gates 232 and 240, inverter 226, and reed relay 250 in the case of limit switch $L_1$. Since the cam surfaces 30 through 35 are horizontally as well as vertically spaced apart, each of the limit switch holding circuits allows the activated limit switch circuit to remain closed until the next limit switch is engaged, including during the rotational travel time between cam surfaces. In this manner, the unit can continue to rotate between cam surfaces. Similar holding circuits are shown in conjunction with pushbutton switches $P_1$ through $P_6$.

The control circuit disclosed can also be operated from a sub-station or remote control unit by supplying the signal from such unit in place of the pushbutton signals as illustrated in FIG. 4.

From the foregoing description it can be seen that the present invention provides for the control of a rotatable unit in a manner that provides efficient and precise retrieval of articles stored on the shelves of the unit. The logic circuit insures that the unit rotates through the shortest available arc to turn from one station to another. The control circuit operating in conjunction with the motor and clutch arrangement insure that the unit is started and stopped in a smooth operation. Although the invention has been described in great detail in order to clearly illustrate its functions, it will be understood that such detail is not intended by way of limitation. Modifications can of course be made by those skilled in the art without departing from the scope of the invention, which is defined by the appended claims.

I claim:

1. In a rotatable storage unit comprising a plurality of stations, and including means to drivingly rotate the unit from a first orientation wherein a first station is positioned at a preselected point to a second orientation wherein a second station is positioned at said preselected point, the improvement comprising:
 a. station selector means for creating an electrical signal corresponding to a station selected by an operator;
 b. circuit means for receiving said station selector signal as an input and providing an output signal to the driving means to cause said unit to rotate from said first station to said second station, said circuit means including:
 forward movement gating means;
 reverse movement gating means;
 logic circuit means for determining the shortest rotational distance between said first and second stations and providing an electrical signal representative of that determination to said forward and reverse gating means;

timing circuit means for selectably adjusting the precise stopping point of said second station when said unit is rotated into said second orientation.

2. The apparatus of claim 1 further comprising a plurality of cam surfaces each corresponding to a respective one of said stations; a plurality of cam followers corresponding to said cam surfaces, each of said cam followers having a switch associated therewith, said switch being activated upon engagement of the cam follower with its respective cam surface.

3. The apparatus of claim 1 wherein said forward movement gating means comprises a positive NAND gate having a plurality of inputs corresponding to said plurality of stations.

4. The apparatus of claim 1 wherein said reverse movement gating means comprises a positive NAND gate having a plurality of inputs corresponding to said plurality of stations.

5. The apparatus of claim 2 wherein said station selector means includes a plurality of pushbutton switches corresponding to said stations.

6. The apparatus of claim 5 wherein said logic circuit means includes a plurality of electronic gate means adapted to receive electrical signals from said cam follower switches and said pushbutton switches, said signals providing the selection criteria for determining the direction of rotation of said unit.

7. The apparatus of claim 6 wherein said plurality of electronic gate means comprises four groups of NAND gates, the number of gates in each group corresponding to the number of stations in said unit, each of said gates receiving electrical signals from preselected ones of said limit switches and said pushbutton switches, the output of said gates being provided as input to said forward movement gating means and said reverse movement gating means.

8. The apparatus of claim 6 including timing circuit means electrically connected between said forward movement gating means and said driving means, said timing circuit means triggered by the signal from said gating means and operable to maintain the unit in rotation for a pre-selected time after the initial engagement of the cam follower switch corresponding to said second station with the cam surface corresponding to said second station.

9. The apparatus of claim 6 including timing circuit means electrically connected between said reverse movement gating means and said driving means, said timing circuit means being triggered by a signal from said gating means and operable to maintain the unit in rotation for a preselected time after the initial engagement of the cam follower switch corresponding to said second station with the cam surface corresponding to said second station.

10. The apparatus of claim 2 including holding circuit means electrically connected to each of said cam follower switches, said holding circuit means holding one of said switches closed once said switch is engaged until engagement of one of the adjacent cam surfaces with its corresponding cam follower switch.

* * * * *